(12) United States Patent
Björkqvist et al.

(10) Patent No.: US 6,456,629 B1
(45) Date of Patent: Sep. 24, 2002

(54) INTERWORKING FUNCTION

(75) Inventors: Mikael Björkqvist, Vårby (SE); Randi Hustad, Høvik (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/126,358

(22) Filed: Jul. 30, 1998

Related U.S. Application Data

(63) Continuation of application No. PCT/SE97/00138, filed on Jan. 29, 1997.

(30) Foreign Application Priority Data

Jan. 30, 1996 (SE) ................................................ 9600332

(51) Int. Cl.⁷ .................................................. H04J 3/16
(52) U.S. Cl. ...................................... 370/466; 370/386

(58) Field of Search ................................. 370/354, 397, 370/410, 395, 522, 384, 466, 386, 395.1; 379/201, 88.25, 230; 455/436, 511

(56) References Cited

U.S. PATENT DOCUMENTS 5,115,427 A 5/1992 Johnson, Jr. et al. ....... 370/391
5,375,118 A 12/1994 Rao et al. .................... 370/401

FOREIGN PATENT DOCUMENTS

EP 0 581 087 2/1994
WO 94/03004 3/1994

*Primary Examiner*—Hassan Kizou
*Assistant Examiner*—John Pezzlo
(74) *Attorney, Agent, or Firm*—Burns, Doane, Swecker & Mathis, L.L.P.

(57) ABSTRACT

For providing an interworking function between an N-ISDN and a B-ISDN, the B-TSDN includes a second Signalling System 7 based data communication protocol including an MTP2 level. The functions are split on a first sublevel and a second sublevel.

20 Claims, 3 Drawing Sheets

| MTP2 functions | MTP2 lower | MTP2 upper |
|---|---|---|
| Signal unit delimitation | x | |
| Signal unit alignment | x | |
| Error detection | x | |
| Error correction | | x |
| Initial alignment | proving | x |
| Signalling link error monitoring | x | x |
| Link state control | state info | x |
| Flow control | | x |

INTERWORKING FUNCTION

This application is a continuation of PCT/SE99/00138, filed on Jan 29, 1997.

The invention relates to data communication networks. In particular it relates to packet-switching networks and to the aspect of such networks interworking.

Definitions of some used terms and abbreviations (STALLNDGS, William, Data and Computer Communications; Macmillan Publishing Company; 1991; and DE PRYCKER, Martin, Asynchronous Transfer Mode: Solution for broadband ISDN; Ellis Horwood series in computer communications and networking; 1991; both herein incorporated by reference)

ISDN: Integrated Services Digital Network;

N-ISDN: Narrowband-ISDN;

SS7: Signalling System Number 7 is a layered set of protocols that is used for control communication internal to a digital network, e.g. an N-ISDN, and provides facilities for establishing, maintaining and terminating connections. It comprises in total four levels;

N-ISLTD: N-ISDN User Part and the fourth level of SS7. It provides for the control signallin needed in an N-ISDN to deal with N-ISDN subscriber calls and related functions;

MTP: Message Transfer Part, lower three levels of SS7, provides a reliable but connectionless service for routing messages through the SS7 network, whereby MTP1 is the Signalling data link and the first level of SS7;

MTP2 is the Signalling link and the second level of SS7. This level is specified in the ITU-T Recommendation Q.703 (03/93) and is herein incorporated by reference. According to the ITU-T Recommendation Q.703 (03/93) the signalling link functions, together with a signalling data link as bearer, provide a signalling link for reliable transfer of signalling messages between two directly connected signalling points. Signalling messages delivered by superior hierarchical levels are transferred over the signalling link in variable length signal units. A signal unit is constituted of a variable length signalling information field which carries the information generated by a user Part and a number of fixed length fields which carry information required for message transfer control. In the case of link stanus signal units LSSU, the signalling information field and the service information octet is replaced by a status field which is generated by the signalling link terminal. There are three types of signal unit, i.e. the message signal units MSU, link status signal units LSSU and fill-in signal units FISU. The signalling link functions comprise signal unit delimitation, signal unit alignment, error detection, error correction, intitial alignment, signalling link error monitoring and flow control. All these functions are coordinated by the link state control;

MTP3 is the Sionallin, network and the third level of SS7

HDLC: HDLC uses synchronous transmission. All transmissions are in frames, and a single frame format suffices for all types of data and control exchanges. The frame has the following fields: Flag, Address; Control; Information; Frame check sequence (FCS); and Flag. Bit stuffing is a procedure which is used for providing data transparency.

B-ISDN: Broadband-ISDN is a service or system requiring transmission channels of supporting rates greater than the primary rates;

B-ISUP: B-ISDN User part;

ATM: Asynchronous Transfer Mode (protocol) is a transfer mode solution for implementing a B-ISDN, comprising three layers defined as the physical layer PHY which mainly transports information;

the ATM layer which mainly performs switching/routing and multiplexing; and the ATM adaptation layer (AAL) which is mainly responsible for adapting service information to the ATM stream;

ST: Signalling terminal;

ET: Exchange terminal;

IWF/IWU: Interworking function/Interworking unit;

NNI: Network to Network interface;

Node: to which stations attach, is the boundery of a communication network, e.g. a B-ISDN network, and the node is capable of transferring data between pairs of attached stations.

BACKGROUND

Both information and parameters are sent from and received by an N-ISDN using the SS7 protocol and are furthermore transmitted in a HDLC (High Level Data Link Control) based frame format, e.g. HDLC or LAP-D. The SS7 and the HDLC based frame format are well known in the art. A B-ISDN, however, sends and receives information and parameters using an ATM protocol which is a specific packet oriented transfer mode based on fixed length cells. The ATM protocol is well known in the art. The difficulty in sending data from one type of network to another resides in the use of different protocols and data formats, frames or cells, required for these protocols.

Special interworking units/functions IWU/IWF have been developed for solving the problem of interworking between N-ISDN and B-ISDN. The interworking is performed either by an Interworking Unit, IWU which is a unit separate from the B-ISDN or an Interworking Function, IWF which is an integral part of the B-ISDN. IWU/DV are specified in the ITU-T Recommendation I.580 from 03.93: "General Arrangements for Interworking between B-ISDN and 64 kbits/s based ISDN". Accordingly a standard NNI is the interface between the 64 kbits/s ISDN, i.e. the N-ISDN. and the IWU/IWF and between the B-ISDN and the IWU/IWF. EP-A-0 581 087 discloses an N-ISDN and a B-ISDN interworking by means of an IWU. The advantage of IWU/IWF is that they are standardised. However, they need a large processing capacity. They are furthermore highly dependent on market adaptations. This entails considerable costs.

SUMMARY

It is an object of the invention to provide an interworking function which needs less processing capacity.

It is a further object of the invention to provide an interworking function which is less dependent on the market adaptations.

It is yet another object of the invention to provide an interworking function which is low in cost.

These and other objects and advantages are obtained according to the invention as disclosed in independent claim 1 and claim 11. Preferred embodiments of the invention are given in the dependent claims.

BRIEF DESCRIPTION OF THE DRAWINGS

Preferred embodiments of the invention will now be explained in greater detail, referring to the drawings in which.

DETAILED DESCRIPTION OF THE EMBODIMENTS

Figure 1:
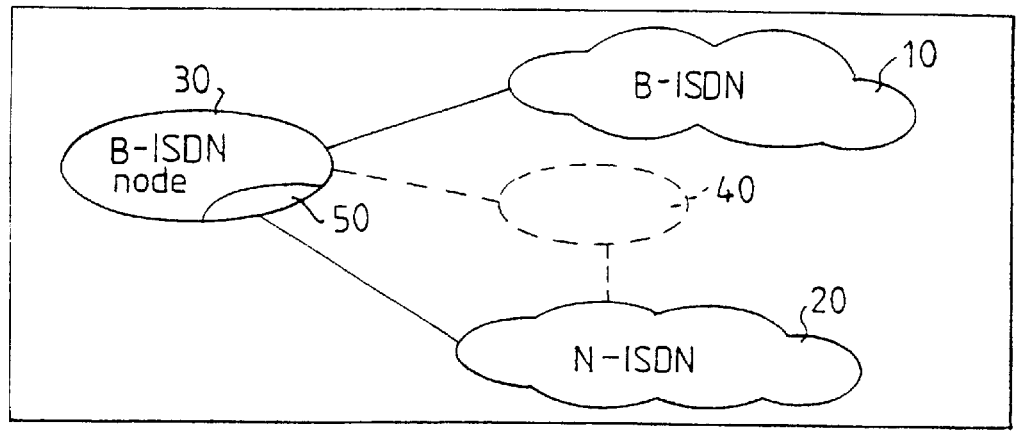
FIG. 1 is a schematic view of networks interworking according to the prior art.

FIG. 1 is a schematic view of a B-ISDN 10 and an N-ISDN 20 interworking according to the prior art.

Figure 2:
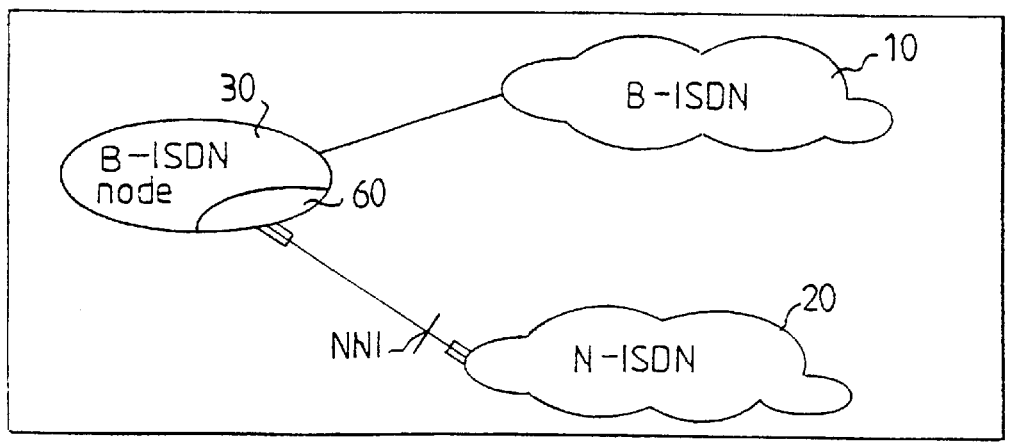
FIG. 2 is a schematic view of networks interworking according to an embodiment of the invention.

FIG. 2 is a schematic view of networks signalling interworking according to an embodiment of the invention. An ATM-based network 10, e.g a B-ISDN, and a SS7-based network 20, e.g. N-ISDN, are interworking by means of an interworking unit 60 comprised in the B-ISDN, for ensuring that a standard NNI is the only interface between the N-ISDN and the B-ISDN.

FIGS. 3a and 3b show two schematic drawings of a B-ISDN 10 and an N-ISDN 20 interworking. In FIG. 3a a B-ISDI 10 can be seen comprising an exchange terminal ET 90 coupled to an ATM-based switch core 70 which is coupled to a signalling link terminal ST 100. A signalling link terminal refers to the means for performing all of the functions defined at level 2 regardless of their implementation. When interworking with a B-ISDN 10, the N-ISDN 20 is coupled to the exchange terminal ET 90 of the B-ISDN 10. A means for achieving the objects of the invention is to provide the B-ISDN 10 with a means for interworking for supporting N-ISDN subscriber calls and related functions within the B-ISDN 10. FIG. 3b describes more specifically the means for interworking. Therein can be seen that the second MTP level of the SS7 80, i.e. MTP2, is split into two sublevels, MTP2 lower 92 and MRP2higher 103. The MTP2 lower 92 is preferably situated in the exchange terminal ET 90 and the MTP2 higher 103 103 in the signalling terminal ST 100. The functions of the MTP2 are thereby split between the MTP2 lower 92 and the MTP2 higher 103.

When an application X of the N-ISDN 20 has a message to an application Y of the N-ISLP supported within the B-ISDN 10, it transfers those data to the N-ISUP 81 of the SS7 80 used in the N-ISDN 20. Parameters containing the required information for the N-ISUP protocol are appended to those data and is passed as a unit together with the data to the MTP3 . This process continues down through MTP2 which generates a unit called frame using e.g. a HDLC based protocol. The frame is then passed by the MTP1 onto the transmission medium. When the frame is received by the B-ISDN 10 it ascends to the N1 of the exchange terminal ET 90. The MTP1 91 strips off the outermost parameters, acts on the protocol information contained therein, and passes the remainder up to the next layer MTP2 lower 92. MTP2 lower 92 strips off the outermost parameters, acts on parts of the protocol information contained therein in accordance with an embodiment of the invention, and passes the remainder to the AAL 93. Parameters are appended to the data that contains the required information for the AAL 93 protocol. In substance one can say that the AAL 93 protocol is a protocol for packeting and segmenting data into cells on transmission and reassembling the data from cells on reception. The cells are then passed by the ATM layer 94 onto the transmission medium and switched by the ATM switch core 70 to be received by an ATM layer 101. The ATM layer 101 strips off the outermost parameters, acts on the protocol information contained therein, and passes the remainder up to the AAL 102. On reception, the AAL 102 reassembles the data from cells in accordance with its protocol and passes the data up to the MTP2 higher 103. MTP2 higher 103 strips off the outermost parameters, acts on the remaining parts of the MTP2 protocol information contained therein in accordance with an embodiment of the invention. and passes the remainder to the MTP3 104. The MTP3 104 sizes off the outermost parameters, acts on the protocol information contained therein, and passes the remainder to the N-ISUP 105. The process continues through N-ISUP 105 for transfering the message of applicantion X to applicantion Y. When applicantion Y has a message for applicantion X, the reverse process occurs.

In a preferred embodiment of the invention, the exchange terminal ET 90 comprised within the B-ISDN 10, comprises the MTP1 level 91, the MTP2 lower 92, an ATM layer 93 and an ALL 92, e. g. AAL5 which is the AAL for Variable Bit Rate VBR. The signalling terminal ST 100 comprises an ATM layer 101, an ATM adaptation layer 102, e.g. AAL5 101, MTP2 higher 103, MTP3 104 and N-ISUP 105.

Figures 3, 4:
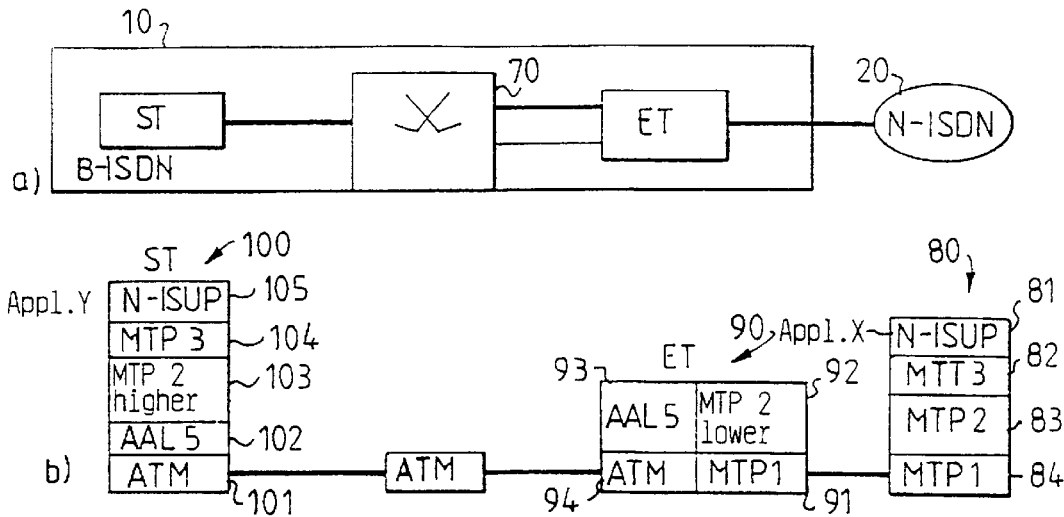
FIG. 3 is a schematic drawing of the interworking function according to an embodiment of the invention.
FIG. 4 is a flow diagram illustrating the split MTP2 layer according to an embodiment of the invention.

In FIG. 4 the main functions of MTP2 are shown. In a broad outline: Signal unit delimitation and alignment provide the functions for bit stuffing, insertion and removal of flags and analysis thereof; Error detection provides the functions for analysing the check bit at the end of each signal unit; Error correction provides the function of retransmission; Intitial alignment provides the functions for indicating the alignment status using four different alignment status indications, i.e. status indication "O" for out of alignment (SIO), "N" for normal alignment status (SIN), "E" for emergency alignment status (SIE) and "OS" for out of service (SIOS), all indications being carried in the status field of the link status signal unit LSSU. The alignment procedure passes through a number of states during the initial alignment one of them being proving by which means the signalling link terminal validates the link's ability to carry signal units correctly by inspecting the signal units; Signalling link error monitoring provides two functions, one which is employed whilst a signalling link is in service and which provides one of the criteria for taking the link out of service, and one which is employed whilst a link is in the proving state of the initial alignment procedure. These are called the signal unit error rate monitor SUERM and the alignment error rate monitor AERM respectively; and lastly flow control for handling a level 2 congestion situation. All the above mentioned functions are coordinated by the link state control. The functions of the MTP2 and the corresponding procedures are well known in the art. FIG. 4 furthermore shows how the different functions of MTP2 are split upon two sublevels in accordance with an embodiment of the invention.

Figure 5:
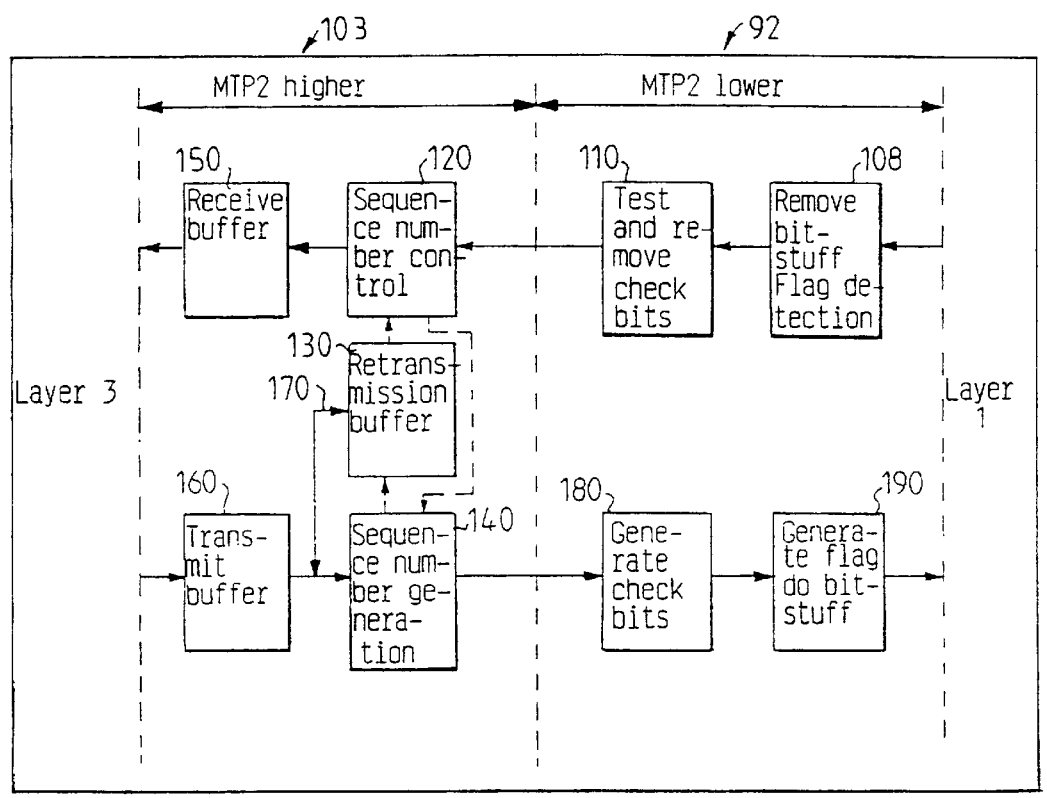
FIG. 5 is a schematic drawing illustrating the functions of the split MTP2 layer according to an embodiment of the invention.

FIG. 5 shows the MTP2 split into two sublevels, the two sublevels being separated by a dotted line. It can be seen that the functions of MTP2 lower 92 relate in general to the handling of the HDLC based frame format and the functions of MTP2 higher 103 in general to error correction, retransmission and flow control of the transferred data. In particular, bit stuffing, flag detection/insertion and handling of the check sum are performed in the MTP2 lower 92, whilst sequence number handling, retransmission and flow control are performed in the MTP2 higher 103.

More specifically, MTP2 higher 103 comprises means for error control and correction 120,130,140 and means for flow control 130,150,160, e.g. buffering means. Link control functions are split between the MTP2 lower 92 and the MTP2 higher 103 in that regarding alignment it is performed in the MTP2 higher 103 except the proving part which is performed in the MTP2 lower 92. Status control is performed in the MTP2 higher 103 except for the status detection which is performed in the MTP2 lower 92. Furthermore, the reliable exchange of message signalling unit MSU is not effected by the split of the M2. The sequence control in MTP2 is located in the MTP2 higher 103 and will function in the same way as without the split.

FIG. 5 shows the functions of the MTP2 layer and how they are distributed between the MTP2 lower 92 and the MTP2 higher 103. When transferring data from lower to higher layers. MTP2 lower 92 receives data from MTP1, strips off the outermost parameters and acts on the protocol information contained therein. It removes the bit stuffing and detects the flags 108. The check bits are tested and removed 110. If errors are detected a signal is sent to the MTP2 higher for error correction. When transferring data from higher to lower layers, the reverse process occurs 180, 190. Furthermore, there is in the MTP2 lower 92 a signal unit error rate monitor SUERM for monitoring the status of the signalling link, e.g. the link status signal unit LSSU "in service". Upon detection of excessive error rate, an internal error signal is generated for being transferred to the MTP2 higher 103. Moreover, there is an alignment error rate monitor AERM for monitoring the alignment of the signalling link, whereby only the proving state of the alignment monitoring is performed in the MTP2 lower 92. If a counter reaches the error threshold during the proving period, an internal error signal is generated for being transferred to the MTP2 higher 103. If the the MTP2 receives a link status signal unit LSSU ocher than SIN/STE, then the proving part of the alignment monitoring is terminated and the LSSU is passed on to the MTP2 higher 103. The generated internal signals may be transferred in the control field. The error thresholds for the SUERM and AERM are parameters which are initialized at restart.

A preferred embodiment regarding error detection and link control may be implemented as following:

In the direction of transferring data from the N-ISDN 20 to the B-ISDN 10, MTP2 lower 92 filters fill in signal units FISU by firstly detecting them and if a FISU is equal to the preceding FISU, then it is discarded; otherwise it is passed through to the MTP2 higher 103. In addition, a FISU may regularly be passed to the MTP2 higher 103 as an "I'm alive" signal. In the direction of transferring data from the B-ISDN 10 to the N-ISDN 20, the fill in signal units FISU will be inserted. To do this the MTP2 lower 92 must keep the sequence numbers from the previous fill in signal unit FISU and use it for the generation of the fill in signal units FISU. The result of the filtering is that only fill in signal units FISU with relevant/new information is passed through to the MTP2 higher 103.

The proving part of the alignment monitoring is handled by the MTP2 lower 92, initiated by the MTP2 higher 103. Proving signal units are generated by the MTP2 lower 92 and the result of the proving is transferred to the MTP2 higher 103.

The alignment status indications, e.g. SIOS/SIO/SIN/SIE, carried by the link status signal unit LSSU are filtered in the MTP2 lower 92. When the MTP2 lower 92 receives one of these link status signal units LSSU, it will repeat it until another one is received. This filtering is valid for both directions and will thus be unburdening the MTP2 higher 103.

Hence, the MTP2 higher 103 will be unburdened from continuous fill in signal units FISU and continuous link status signal units LSSU. However, for security in case a Link signal is lost, fill in signal units FISU and link status signal units LSSU will regularly be transferred from the MTP2 lower 92 to the MTP2 higher 103. MTP2higher 103 sends a signal to the MTP2lower 92 when proving of alignment should be initiated by the MTP2lower 92. A counter sudervises the MTP2lower 92 when proving.

The MTP2higher 103 is informed by the MTP2lower 92 of excessive error rate during the signalling link error detection by an internal error signal.

The functions of the MTP2lower 92 can be implemented in a access processor of the exchange termination board 90 and the MTP2 upper in a central processor, the signalling terminal ST 100. N-ISUP termination and/or message mapping to the B-ISUP can be handled in the B-ISDN node. By N-ISUP termination in the B-ISDN node, real N-ISDN functionality can be provided within the B-ISDN.

The invention is also applicable whenever two CCSS7 based networks are interworking, i.e. MTP2 interworking with other layer 2 protocols.

What is claimed is:

1. A method for interworking between a first data communication network and a second data communication network, said first data communication network comprising a first Signalling System 7 based data communication protocol, and said second data communication network comprising a second data communication protocol, said method comprising the steps of:

dividing a set of second level functions of a signalling link of a second Signalling System 7 based data communication protocol between two terminals of the second data communication network to form respective first and second predetermined sets of functions;

processing data in accordance with the first predetermined set of functions for supporting a user of said second Signalling System 7 based data communication protocol within said second data communication network;

adapting said processed data to said second data communication protocol such that said processed data may be routed by said second data communication network;

adapting said routed data to said second Signalling System 7 based data communication protocol; and processing said adapted routed data in accordance with the second predetermined set of functions of said signalling link of said second Signalling System 7 based data communication protocol.

2. The method according to claim 1, wherein said first predetermined set of functions, as a result of said processing, generates internal signals for transferring to said second predetermined set of functions for correction of said data.

3. The method according to claim 1, wherein said first predetermined set of functions includes functions for handling error detection, link status detection, and alignment detection.

4. The method according to claim 1, wherein said second predetermined set of functions includes functions for handling error correction, retransmission, and flow control.

5. The method according to claim 1, wherein said first data communication network is an N-IDSN.

6. The method according to claim 1, wherein said second data communication network is a B-ISDN.

7. The method according to claim 1, wherein said second data communication network is a Signalling System 7 based data communication network.

8. The method according to claim 7, wherein said second data communication network is an N-ISDN.

9. The method according to claim 1, wherein said first and second Signalling System 7 based data communication protocols handle data in accordance with a HDLC based format.

10. The method according to claim 1, wherein said second data communication protocol handles data in accordance with an ATM based format.

11. A system for interworking between data communication networks, the system comprising:

a first data communication network having a first Signalling System 7 based data communication protocol;

a second data communication network having a second data communication protocol and further including a second Signalling System 7 based data communication protocol, said second Signalling System 7 based data communication protocol comprising a set of second level functions that are divided between two terminals of the second data communication network to form respective first and second sublevels;

means for processing data in accordance with functions included in said first sublevel for supporting a user of said second Signalling System 7 based data communication protocol within said second data communication network;

means for adapting said processed data to said second data communication protocol such that said data may be routed by said second data communication network;

means for adapting said routed data to said second Signalling System 7 based data communication protocol; and means for processing said adapted routed data in accordance with functions included in said second sublevel.

12. The system according to claim 11, wherein said first sublevel, as a result of said processing, is adapted to generate internal signals for transferring to said second sublevel for correction of said data.

13. The system according to claim 11, wherein the first sublevel includes functions for handling error detection, link status detection, and alignment detection.

14. The system according to claim 11, wherein the second sublevel includes functions for handling error correction, retransmission, and flow control.

15. The system according to claim 11, wherein said first data communication network is an N-ISDN.

16. The system according to claim 11, wherein said second data communication network is a B-ISDN.

17. The system according to claim 11, wherein said second data communication network is a Signalling System 7 based data communication network.

18. The system according to claim 17, wherein said second data communication network is an N-ISDN.

19. The system according to claim 11, wherein said first and second Signalling System 7 based data communication protocols are adapted to handle data in accordance with a HDLC based format.

20. The system according to claim 11, wherein said second data communication protocol is adapted to handle data in accordance with an ATM based format.

* * * * *